United States Patent [19]

Hsu

[11] Patent Number: 4,629,537

[45] Date of Patent: Dec. 16, 1986

[54] COMPACT, LIGHT-WEIGHT, SOLID-OXIDE ELECTROCHEMICAL CONVERTER

[76] Inventor: Michael S. Hsu, Roundhill Rd., Lincoln, Mass. 01773

[21] Appl. No.: 735,441

[22] Filed: May 17, 1985

[51] Int. Cl.[4] .................... C25D 5/02; C25B 9/00; B05D 5/12; H01M 8/10
[52] U.S. Cl. .................................... 204/15; 204/38.5 204/266; 204/270; 204/290 R; 204/279; 427/115; 429/32; 429/33; 429/39
[58] Field of Search ................ 204/253–258, 204/267–270, 290 R, 15, 38 S; 427/115; 429/30, 32, 33, 38, 39

[56] References Cited

U.S. PATENT DOCUMENTS

| | | | |
|---|---|---|---|
| 3,394,032 | 7/1968 | Danner | 429/26 |
| 3,432,353 | 3/1969 | Von Krusenstierna et al. | 429/39 |
| 3,460,991 | 8/1969 | White, Jr. | 429/30 |
| 3,505,114 | 4/1970 | Rohr | 429/32 |
| 3,526,548 | 9/1970 | Accorsi et al. | 429/38 X |
| 3,526,549 | 9/1970 | Archer et al. | 429/32 |
| 3,554,808 | 1/1971 | Fischer et al. | 429/32 |
| 4,042,483 | 8/1977 | Bouy et al. | 427/115 X |
| 4,056,452 | 11/1977 | Campbell | 204/266 X |
| 4,087,976 | 5/1978 | Morrow, Jr. et al. | 60/643 |
| 4,197,362 | 4/1980 | Schmidberger et al. | 427/115 X |
| 4,210,512 | 7/1980 | Lawrence et al. | 204/257 |
| 4,490,445 | 12/1984 | Hsu | 429/32 |

OTHER PUBLICATIONS

Westinghouse Electric Corp., *Annual Report Covering the Period Apr. 1, 1978 to Mar. 31, 1979*, Apr. 30, 1979, pp. 3–5.

Argonne National Laboratory, *Advanced Fuel Cell Development Progress Report for Apr.–Jun.* 1983, excerpts.

*Primary Examiner*—Donald R. Valentine
*Attorney, Agent, or Firm*—Thomas J. Engellenner

[57] ABSTRACT

A compact, light-weight solid-oxide electrochemical converter can be achieved using thin plates of electrolyte and interconnector. Impermeable, straight, thin plates of solid-oxide electrolyte are fabricated by high energy plasma spray methods under controlled temperature conditions. Thin sheets of nickel or platinum alloys can be used to form the interconnector. A protective coating is preferred on the contact points to provide electrical continuity when nickel alloys are employed. Stamping or electrodeposition techniques can be used to form corrugated patterns for reactant distribution over the surfaces of each electrolyte plate.

27 Claims, 6 Drawing Figures

COMPACT, LIGHT-WEIGHT, SOLID-OXIDE ELECTROCHEMICAL CONVERTER

BACKGROUND OF THE INVENTION

This invention relates to electrochemical converters employing solid oxide electrolytes and methods for making the same. Such devices perform fuel-to-electricity conversions in a fuel cell (electric generator) mode or electricity-to-fuel conversions in an electrolyzer (fuel synthesizer) mode. The converters are capable of high efficiencies, depending only on the relation between the free energy and enthalpy of the electrochemical reaction and are not limited by Carnot-cycle considerations.

The key components in an electrochemical energy converter are a series of electrolyte units onto which electrodes are applied and a similar series of interconnectors disposed between the electrolyte units to provide series electrical connections. Each electrolyte unit is an ionic conductor with low ionic resistance allowing the transport of an ionic species from one electrode-electrolyte interface to the opposite electrode-electrolyte interface under the operation conditions of the converter. Is is known that zirconia stabilized with such compounds as magnesia, calcia or yttria can satisfy these requirements when operating at high temperature (about 1000° C.). This material utilizes oxygen ions to carry electrical current. The electrolyte should not be conductive to electrons which can cause a short-circuit of the converter. On the other hand, the interconnector must be a good electronic conductor. The interaction of the reacting gas, electrode and electrolyte occurs at the electrode-electrolyte interface which requires that the electrodes be sufficiently porous to admit the reacting gas species and to permit exit of product species.

Solid-oxide devices formed in hollow tubular configurations are known. See, for example, U.S. patent 3,460,991 issued to D. W. White, Jr. on Aug. 12, 1969. Work on such tubular solid-oxide electrolytes also was reported in a publication *Thin Film Fuel Cell/Battery Power Generating System* (Westinghouse R&D Center 1979). The electrolyte, electrodes and interconnector components disclosed in this work were fabricated using electrochemical vapor deposition (EVD) and layer masking techniques. Additionally, a monolithic honeycomb design was disclosed in a publication *Advanced Fuel Cell Development* (Argonne National Laboratory 1983). The Argonne Laboratory work employed casting and isostatic forming techniques followed by high-temperature fusion of the components to form a converter.

These prior art approaches have demanded materials having equal thermal expansion coefficients to assure mechanical integrity throughout the temperature excursions encountered in fabrication and usage. This integrity requirement over a wide temperature range has imposed severe restrictions on material selections and consequently in the methods of fabrication.

The concept and approach of forming the components as free-standing plates to circumvent the thermal/structural integrity problem was disclosed by the present inventor in U.S. Pat. No. 4,490,445, issued Dec. 25, 1984, herein incorporated by reference.

There exists a need for more compact, lightweight, efficient converters that are easier to manufacture and more economical in use. In particular, an electrochemical converter employing free-standing plates and having a power-to-weight ratio (in terms of kilowatts per kilogram) of 0.2 or greater would satisfy a long felt need in the industry.

SUMMARY OF THE INVENTION

Compact, light-weight and efficient electrochemical converters can be formed from thin structural components designed to optimize conversion efficiency. In accordance with this invention, flat plates of the solid-oxide electrolytes and interconnectors are used. Plasma-spray techniques are used to produce impermeable, straight, free-standing thin electrolyte plates. Preferably the electrolyte plates are formed on a reusable, separable substrate. Substrate materials with high temperature properties and low interface holding strength such as graphite have been found to be particularly suitable. In one aspect of the invention the impermeable properties of the plate are obtained by a high power plasma-spray process. The straightness of the plates preferably is controlled by maintaining an isothermal condition across the substrate surface throughout the fabrication process. A method of uniform and constant temperature control is described below For the purposes of this invention, the term "high power" is used to define plasma-spraying techniques wherein an electrolyte powder is passed through an arc discharge of at least about 30 kilowatts, preferably about 50 kilowatts or greater, to generate a plasma spray. It has been found that when solid oxide electrolyte plates are formed from such a high power plasma, plates with thickness on order of 50 to 750 microns with less than 25 microns out-of-plane distortion, can be formed while maintaining high impermeability to hydrogen and other fuel gases. It has also been found that a high power plasma allows the formation of plates that can be more easily sintered to high densities (i.e., over 90 percent of theoretical material density).

In another aspect of the invention, lightweight interconnector plates with corrugated patterns, providing passages for the distribution of reactants, are disclosed. The plates are formed from metals that optimize the weight and energy conversion requirements. Ease of fabrication, together with high strength and good chemical resistance at high temperatures characterize the preferred interconnector materials. Platinum alloys have been found to be malleable, strong and non-reactive in the operating temperature range. Platinum is particularly desirable because of its low hydrogen permeation. Platinum alloy sheets of about 25 to 250 microns thickness have been found suitable in terms of thermal/mechanical and permeation cirteria. Nickel alloy sheets of about 200 to 500 microns have also been found suitable. To assure the electrical continuity of the interconnector in high temperature oxidizing environments, thin coatings (i.e., 10 microns or less) of gold, silver or platinum are preferred on the contact points when nickel alloys are used. High temperature and long duration tests have demonstrated the durability and stability of such contact coatings. Stamping and deposition techniques are disclosed to form the corrugated patterns of the interconnector plates.

The invention will next be described in connection with certain preferred embodiments. However, it should be clear that various changes and modifications can be made by those skilled in the art without departing from the spirit or scope of the invention. For example, although the electrolyte-interconnector stacks are shown in a schematic tubular, columnar configuration, such stacks can also have a square outer shape. Additionally, they can be paired to form hairpin pendants with U bends to achieve better structural rigidity and more convenient one-sided terminations for gas manifolding and electrical connections. Bus bars can be provided to tap or supply electricity to the electrochemical pendants in multiple parallel connections. A heat exchanger can also be provided to serve as a thermal conduction buffer or preheat incoming gases with a counter flow scheme. These structures and configurations are further described in U.S. Pat. No. 4,490,445 cited above and incorporated by reference.

DETAILED DESCRIPTION

Figure 1:
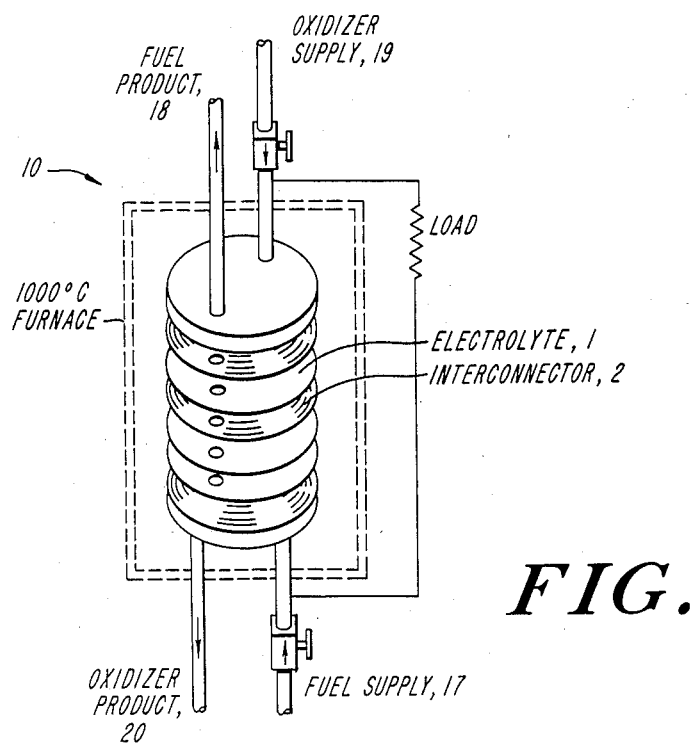
FIG. 1 is a schematic, isometric view of an electrochemical energy converter utilizing structures fabricated according to the invention.

In FIG. 1, an electrochemical converter 10 employing the compact, lightweight components of the present invention is shown consisting of alternating electrolyte plates 1 and interconnector plates 2. Holes through the plates form the passages for fuel and oxidizer gases. Grooves in the interconnector plates facilitate the distribution and collection of the gases. The cell stacks can be assembled in compression, by which the electrical contacts and gas seals are maintained.

Figure 2:
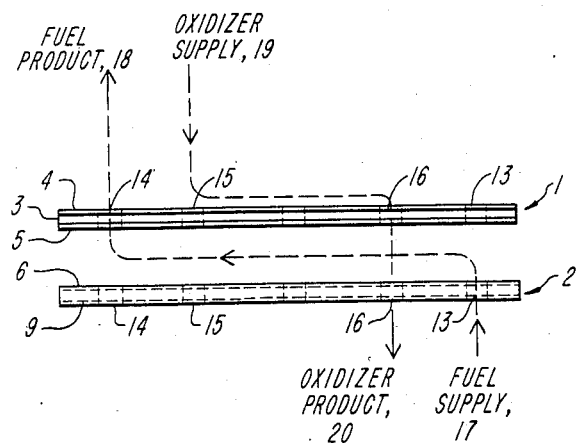
FIG. 2 is a cross-sectional view of an electrolyte component and an interconnector component of an electrochemical cell stack fabricated according to the invention.
Figure 3:
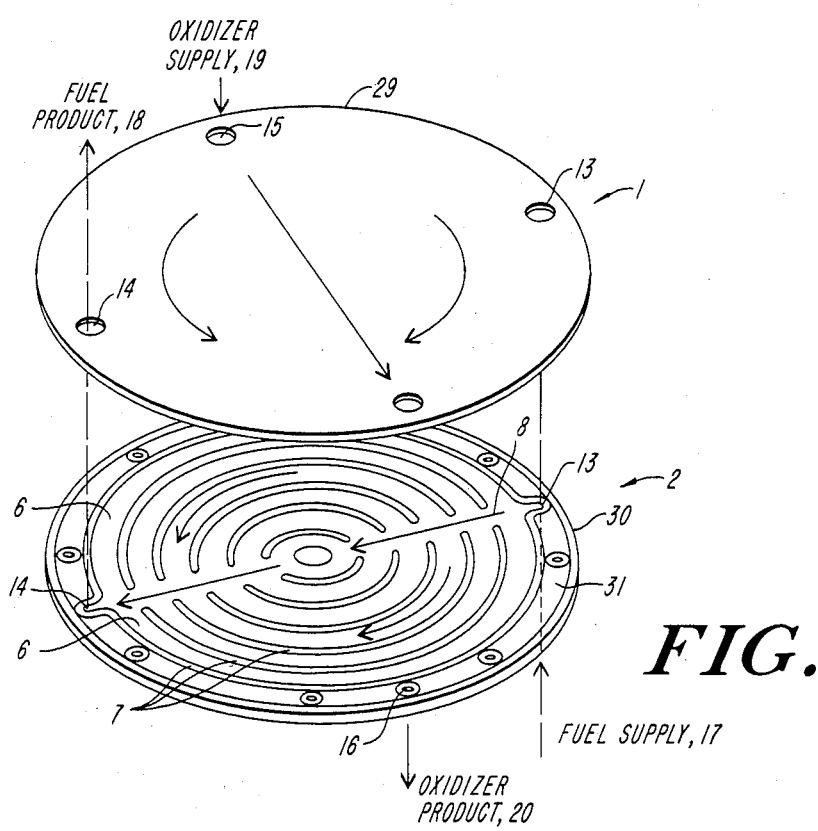
FIG. 3 is a more detailed isometric view of the electrolyte and interconnector component fabricated according to the invention.

In FIGS. 2 and 3, the basic cell unit in the electrochemical cell stack is shown comprising a single electrolyte plate 1, and a single interconnector plate 2. The electrolyte plate 1 is made of stabilized zirconia $ZrO_2 \cdot (Y_2O_3)$ material 3, on which a porous oxidizer electrode 4 and a porous fuel electrode 5 are coated. Preferred materials for the oxidizer electrodes are perovskites such as $LaMnO_3(Sr)$. Preferred materials for fuel electrodes are cermets such as $ZrO_2/Ni$. The interconnector plate 2 preferably is made of a metal such as a platinum alloy or Inconel, a nickel alloy. It serves as the electric connector between adjacent electrolyte plates and as a partition between the fuel and oxidizer gases as well as providing a heat conduction path along the electrode surfaces 4, 5 and to the outer edges of the plates 1 and 2.

Fuel can be supplied to the cell stack through an axial (with respect to the stack) manifold 17 coupled to the stack via holes 13 and the fuel product is exhausted through manifold 18 via holes 14. The fuel is distributed over the fuel electrode surface 5 through an in-plane groove network 6 formed in the upper surface of the interconnector plate 2. The notches 8 made in ridges 7 provide openings into the groove network 6 connecting holes 13 and 14 at the surface of each fuel electrode 5. The oxidizer is fed to the stack from manifold 19 via holes 15 and its product is exhausted through manifold 20 via holes 16. The oxidizer is distributed over the oxidizer electrode surface of the next electrolyte plate through a complementary in-plane groove network 9 formed in the lower surface of the conductor plate 2. A similar network on the lower surface of the adjacent cell above provides the passages for the oxidizer along electrolyte plate 1 as shown in FIG. 3. The outer ridges of the groove networks 6 and 9 on the interconnector plates 2 are brought in contact with electrolyte plates 1 to form the sealed outer walls of stack assembly. The ridges 7 are pressed against the electrodes in assembly to achieve electrical contacts. The stack can be secured by water-cooled tension rods (not shown) which are disposed in bolt holes 12 to provide the assembly force.

It is to be understood that the apparatus related to this invention can be utilized as a fuel cell (electric generator) when gaseous fuel is supplied or be applied as an electrolyzer (fuel synthesizer) when electricity is applied. It is applicable to all reversible reactions involving exchanging of oxygen such as:

$H_2 + \tfrac{1}{2} O_2 = H_2O$ $SO_2 + \tfrac{1}{2} O_2 = SO_3$ $CO_2 + \tfrac{1}{2} O_2 = CO_2$ and $NH_3 + 5/4 O_2 = NO + 3/2 H_2O$ To achieve compact, lightweight and efficient devices, components with thin structure are desired. The volumetric power density ($P_v$) of the planar cell stack is determined by the surface power density ($P_s$) of the electrolyte and the geometrical factors. The relationship can be represented by the equation:

$P_v = P_s * V/S$ where S is the height of a cell unit in a planar stack and V is the volumetric packaging efficiency. For an assembly of planar cell stack with a modest $P_s$ of 0.2 W/cm$^2$, and V of 0.7, $P_v$ equals 0.1 W/cm$^3$ or 100 kW/m$^3$ when S, the unit cell height, is 0.15 cm or 1500 um. The cell unit height S, is determined by the sum of the thicknesses of the electrolyte and interconnector plates.

The thin electrolyte plates of this invention can be prepared using a high energy plasma-spray technique. For example, a powder comprising zirconia stabilized with magnesia, calcia or yttria is first suspended in a working gas such as nitrogen or argon and the suspension then is passed through an arc discharge. The oxide particles are heated by the discharged gas to their molten state and ejected from a nozzle onto a substrate, which has a surface corresponding to the desired configuration of the final electrolyte plate. The arc discharge is typically at least about 30 kilowatts, preferably at least 50 kilowatts to generate a high energy plasma spray.

It has been found that a suitable high energy plasma spray can be generated employing an arc discharge having a voltage of at least 30 volts and a current of at least 800 amperes. Such a plasma spray can be generated by a variety of commerical devices, such as the Bay State Plasma Spray System manufactured by Bay State Abrasives, a Division of Dresser Industries, Inc., Westborough, Mass. Preferably, the oxide powders used in plasma spray process should have a mean particle size ranging from about 40 to about 100 microns and the spray rate can range from 2 to about 8 pounds per hour.

Figure 4:
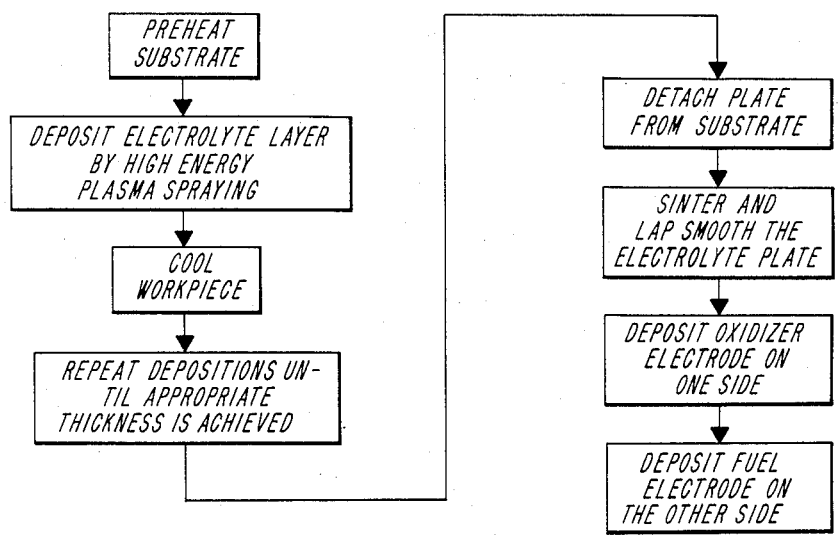
FIG. 4 is a schematic block diagram of the electrolyte fabrication process according to the invention.

In FIG. 4, a block diagram is presented of an electrolyte plate manufacturing process according to the invention. The process begins with a substrate, preferably a substrate with proper adhesion with the solid oxide to be deposited. The substrate allows particles to adhere until a continuous coating of the desired thickness is obtained while permitting subsequent removal of the electrolyte plate by thermal or mechanical means without fracturing. For example, a suitable substrate surface can be achieved with graphite. Generally, the degree of roughness which is desired is between about 2.5 microns and about 25 microns finish. The substrate is preferably preheated to about 150° C.–300° C. prior to the commencement of oxide deposition.

As noted above, the solid oxide electrolyte is deposited onto the substrate by a high energy plasma spray. Preferably, the plate is obtained by a multiple step deposition process. For example, when the temperature of the substrate exceeds about 250° C., spraying is interrupted and the workpiece (substrate) is allowed to cool, typically to about 230° C. Once the workpiece is sufficiently cooled, another layer is deposited. This process is continued until a plate of sufficient thickness (e.g., 50 to 750 microns) is obtained. The plate can be detached from the substrate by a mechanical impact or thermal quenching to induce sufficient stress at the interface to overcome the adhesion between the plate and substrate. The plate is typically sintered next at about 1400° C. to 1600° C. to further densify the electrolyte material. The solid-oxide plate obtained by the multiple step spraying process has a density approaching about 90% theoretical density. During sintering, the solid-oxide plate experiences a linear shrinkage of about 2% which results in a product approaching about 96% theoretical density.

After sintering, the plates are lapped slightly to produce a smooth surface and then a fuel electrode and oxidizer electrode are deposited on opposite sides of each plate, for example, by a flame deposition technique or a slurry application technique which produces coatings of a desired porosity of about 30–40 percent.

Figure 5:
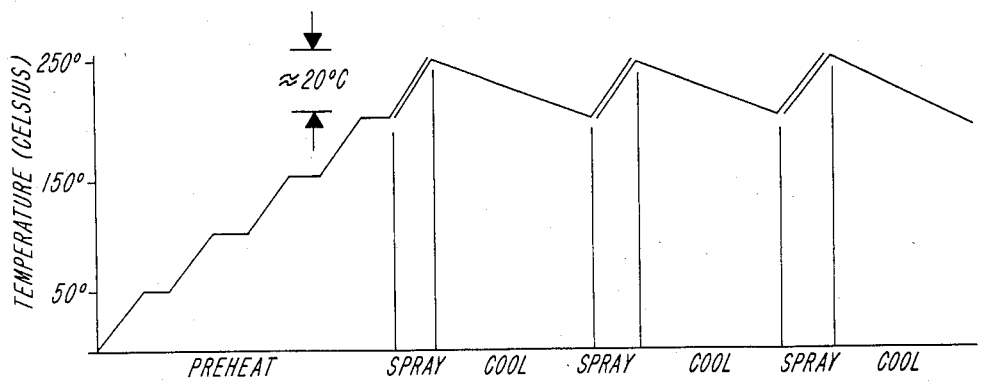
FIG. 5 is a graph of temperature and deposition conditions over time for a typical electrolyte fabrication process according to the invention.

In FIG. 5, the spray deposition process of the invention is further illustrated by a graph which plots temperature and the spray operation over time. Preheating can be conveniently achieved by impinging hot gas on the substrate using the plasma spray gas without the oxide powder. The interim cooling steps can be accomplished by natural convection, forcing a non-reactive room temperature gas over the workpiece or by a coolant circulating network integrated into the substrate.

The preferred materials for the thin interconnector plates of this invention were selected based on the following requirements: (1) strength as well as electrical and thermal conductivity were necessary at 1000° C., which is the operation temperature of the converter; (2) good oxidation resistance was also necessary up to the working temperature; (3) chemical stability with fuel species was required; and (4) manufacturing economy when formed into the corrugated plate configuration, likewise was needed.

Two types of metals, nickel and platinum alloys were found to be most suitable. The relevant material properties are listed below in Table I.

TABLE I

| TYPICAL NICKEL AND PLATINUM PROPERTIES | | | |
|---|---|---|---|
| | | Nickel Alloy | Platinum Alloy |
| DENSITY | (g/cm$^3$) | 8.17 | 21.5 |
| HEAT CAPACITY | (J/g °C.) | 0.46 | 0.2 |
| THERMAL CONDUCTIVITY | (W/cm °C.) | 0.173 | 0.72 |
| THERMAL EXPANSION COEFFICIENT | (1/°C.) | $1.7 \times 10^{-5}$ | $0.8 \times 10^{-5}$ |
| TENSILE STRENGTH AT 1000° C. | (kPa) | 7,000 | 70,000 |
| HYDROGEN PERMEATION | (cm$^2$/sec) | $10^{-3}$ | $10^{-4}$ |

It has been discovered that nickel alloys of 200 to 500 microns thickness and platinum alloys of 25 to 150 microns can be applied to form corrugated plates of 1000 microns in height. The corrugated interconnectors exhibit excellent stiffness in spite of thin materials. The permeation of hydrogen is limited to a small portion of the fuel consumption rate. Nickel, which forms a thin, protective, and insulative coating in an oxidation environment, requires thin (10 microns or less) coatings such as silver, gold, or platinum on contact surfaces.

Figure 6:
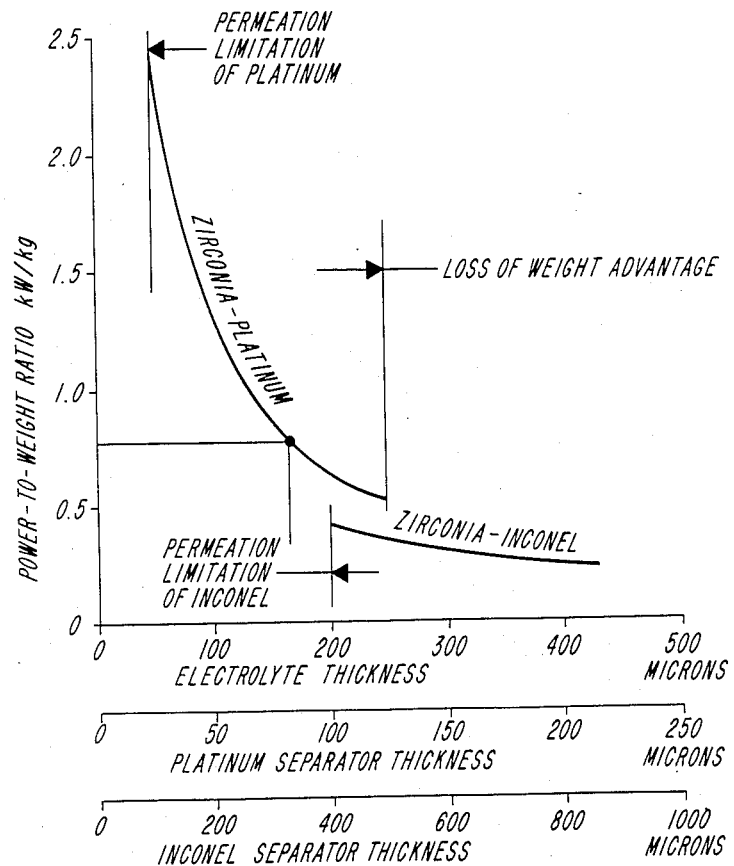
FIG. 6 shows the relationship of the power-to-weight ratio to the thickness of the electrolyte and interconnector components fabricated according to the invention.

Results of a weight analysis are presented in FIG. 6. The study selected the electrolyte thickness as a variable. Based on thermal and structural requirements, a nickel separator having a thickness twice that of the electrolyte was selected; the separator platinum thickness was chosen to be about one half that of the electrolyte. The power-to-weight ratio of an unpackaged system, excluding the insulation enclosure, heat exchanger or piping, was computed. The packaged system is anticipated to add no more than 50% of weight to the unpackaged system. For example, as shown in the figure, devices of better than 750 W/kg of an unpackaged weight, can be achieved with platinum separator of 75 um or thinner. The nickel system can achieve 350 W/kg.

The corrugated top and bottom patterns of the interconnectors can be obtained, for example, by stamping the nickel or platinum alloy sheets with one or more sets of matched male and female dies. The dies are prefabicated according to the desired configuration of the product, and can be hardened by heat treatment to withstand the repetitive compressing actions in mass productions. The stamp forming process for the interconnectors preferably is conducted in multiple steps due to the geometrical complexity of the gas passage networks. For example, grooves are formed in initial strokes, which are followed by notch forming to provide gas cross-flow passages. Holes in the interconnectors are punched out at the final step. Temperature annealling is recommended between the consecutive steps to prevent the overstressing of sheet metal. The stamping method is capable of producing articles of complex geometry while maintaining uniform material thickness. Alternatively, corrugated interconnectors can be formed by electrodepostion on an initially flat metal plate using a set of suitable masks.

What is claimed is:

1. A method of constructing an electrochemical converter, the method comprising:
    (a) forming a set of solid-oxide electrolyte plates by suspending a powder comprising zirconia stabilized with at least one material chosen from the group of magnesia, calcia and yttria in a gas, passing the suspension through an arc discharge of at least 30 kilowatts to generate a plasma spray and deposit a thin layer upon a substrate, uniformly cooling the deposited layer, repeating the deposition process until plates of about 50 to about 750 microns in thickness are deposited, and then removing the plates from the substrate;
(b) coating said electrolyte plates with a fuel electrode material on one surface of each plate and an oxidizer electrode material on a second surface of each plate;
(c) forming a set of interconnector plates having corrugated metal structures, comprising at least one metal chosen from the group of platinum and nickel alloys, the metal plate having a thickness ranging from about 25 to about 250 microns in the case of platinum alloys and having thickness ranging from about 100 to about 1000 microns in the case of nickel alloy, the corrugated structure defining groove networks for the passage of gases and ridges for gas seals and electrical contact with the electrode coatings of the electrolyte plates; and
(d) assembling the converter by stacking alternating layers of the electrolyte and interconnector plates together.

2. The method of claim 1 wherein the step of forming the electrolyte plates further includes employing an arc discharge having a voltage of at least 30 volts and a current of at least 800 amperes to generate the plasma spray.

3. The method of claim 1 wherein the step of forming the electrolyte plates further includes employing a powder having a mean particle size ranging from about 40 microns to about 100 microns.

4. The method of claim 1 wherein the step of forming the electrolyte plates further includes interrupting the deposition of the plasma when the substrate temperature exceeds a predetermined limit, and reinitiating deposition when the substrate temperature cools by about 20 degrees Celsius.

5. The method of claim 1 wherein the step of forming the electrolyte plates further includes passing a coolant through the substrate during the formation process.

6. The method of claim 1 wherein the step of forming the electrolyte plates further comprises passing a nonreactive gaseous coolant over the plate between the deposition of each layer.

7. The method of claim 1 wherein the step of forming the electrolyte plates further includes generating a plasma spray rate having a transport rate of about 2 to about 8 pounds per hour.

8. The method of claim 1 wherein the method further comprises preheating the substrate prior to the initial deposition.

9. The method of claim 1 wherein the step of coating the electrolyte plates further comprises coating one surface with a perkovite material to form an oxidizer electrode and coating a second surface with a cermet material to form a fuel electrode.

10. The method of claim 9 wherein the step of coating further comprises forming the coatings by flame or slurry deposition techniques.

11. A method of forming a solid oxide electrolyte plate, the method comprising:
(a) suspending a powder comprising zirconia and at least one stabilizing oxide chosen from the group of magnesia, calcia and yttria in a gas,
(b) passing the suspension through an arc discharge of at least 30 kilowatts to generate a plasma spray and deposit a thin layer upon a substrate,
(c) uniformly cooling the deposited layer,
(d) repeating the deposition process until a plates of about 50 to about 750 microns in thickness are deposited, and
(e) then removing the plate from the substrate;

12. The method of claim 11 wherein the method further includes employing an arc discharge having a voltage of at least 30 volts and a current of at least 800 amperes to generate the plasma spray.

13. The method of claim 11 wherein the method further includes employing a powder having a mean particle size ranging from about 40 microns to about 100 microns.

14. The method of claim 11 wherein the method further includes interrupting the deposition of the plasma when the substrate temperature exceeds a predetermined limit and reinitiating deposition when the substrate temperature cools by about 20 degrees Celsius.

15. The method of claim 11 wherein the method further includes passing a coolant through the substrate during the formation process.

16. The method of claim 11 wherein the method further comprises passing a nonreactive gaseous coolant over the plate between the deposition of each layer.

17. The method of claim 11 wherein the method further includes generating a plasma spray rate having a transport rate of about 2 to about 8 pounds per hour.

18. The method of claim 11 wherein the method further comprises preheating the substrate prior to the initial deposition.

19. The method of claim 11 wherein the method further comprises coating one surface with a perkovite material to form an oxidizer electrode and coating a second surface with a cermet material to form a fuel electrode.

20. The method of claim 19 wherein the method further comprises forming the coatings by flame or slurry deposition techniques.

21. A method of forming an interconnector plate for use in an electrochemical convertor, the interconnector plate serving to provide electrical connection between an oxidizer electrode of a first electrolyte disposed on one side of the interconnector plate and a fuel electrode of a second electrolyte disposed on the other side of the interconnector plate, the plate also serving to isolate and distribute separate reactant gases over the oxidizer and fuel electrodes of the first and second electrolytes, the method comprising
(a) forming a flat plate from a metal chosen from the group of platinum and nickel alloys the thickness of the plate ranging from about 25 to about 250 microns in the case of platinum alloys and from about 100 to about 1000 microns in the case of nickel alloys;
(b) defining a corrugated pattern of ridges and grooves on one side of the plate to permit the isolation and distribution of a first reactant gas on the one side;
(c) defining a complementary corrugated pattern of ridges and grooves on the other side of the plate to permit the isolation and distribution of a second reactant gas on the other side; and
(d) providing holes for introduction of the first reactant gas onto the one side and for the introduction of the second reactant gas onto the other side.

22. The method of claim 21 wherein the corrugated patterns are defined by stamping.

23. The method of claim 21 wherein the corrugated patterns are defined by electrodeposition.

24. The method of claim 21 wherein the method further comprises coating the ridges which provide contact points to adjacent electrodes with a non-oxidizing metal when the interconnector plate is formed from a nickel alloy.

25. An electrochemical converter comprising:

(a) a set of solid-oxide electrolyte plates formed by suspending a powder comprising zirconia stabilized with at least one material chosen from the group of magnesia, calcia and yttria in a gas, passing the suspension through an arc discharge of at least 30 kilowatts to generate a plasma spray and deposit a thin layer upon a substrate, uniformly cooling the deposited layer, repeating the deposition process until plates of about 50 to about 750 microns in thickness are deposited, removing the plates from the substrate; and then coating said electrolyte plates with a fuel electrode material on one surface of each plate and an oxidizer electrode material on a second surface of each plate; and (b) a set of interconnector plates having corrugated metal structures, comprising at least one metal chosen from the group of platinum and nickel alloys, the metal plate having a thickness ranging from about 25 to about 250 microns in the case of platinum alloys and having thickness ranging from about 100 to about 1000 microns in the case of nickel alloy, the corrugated structure defining groove networks for the passage of gases and ridges for gas seals and electrical contact with the electrode coatings of the electrolyte plates;

wherein the converter is assembled by stacking alternating layers of the electrolyte and interconnector plates together.

26. A solid oxide electrolyte plate for use in a electrochemical converter formed by suspending a powder comprising zirconia and at least one stabilizing oxide chosen from the group of magnesia, calcia and yttria in a gas, passing the suspension through an arc discharge of at least 30 kilowatts to generate a plasma spray and deposit a thin layer upon a substrate, uniformly cooling the deposited layer, repeating the deposition process until a plates of about 50 to about 750 microns in thickness are deposited, and then removing the plate from the substrate.

27. An interconnector plate for use in an electrochemical converter, the interconnector plate serving to provide electrical connection between an oxidizer electrode of a first electrolyte disposed on one side of the interconnector plate and a fuel electrode of a second electrolyte disposed on the other side of the interconnector plate, the plate also serving to isolate and distribute separate reactant gases over the oxidizer and fuel electrodes of the first and second electrolytes, the interconnector plates being formed as a flat plate from a metal chosen from the group of platinum and nickel alloys, the thickness fo the plate ranging from about 25 to about 250 microns in the case of platinum alloys and from about 100 to about 1000 microns in the caes of nickel alloys; the plate having a corrugated pattern of ridges and grooves on one side thereof to permit the isolation and distribution of a first reactant gas on the one side and a complementary corrugated pattern of ridges and grooves on the other side of the plate to permit the isolation and distribution of a second reactant gas on the other side; and holes for introduction of the first reactant gas onto the one side and for the introduction of the second reactant gas onto the other side.

* * * * *